United States Patent
Yasui et al.

(10) Patent No.: US 7,204,081 B2
(45) Date of Patent: Apr. 17, 2007

(54) EXHAUST GAS PURIFYING APPARATUS AND METHOD FOR INTERNAL COMBUSTION ENGINE, AND ENGINE CONTROL UNIT

(75) Inventors: Yuji Yasui, Saitama-ken (JP); Jun Iwamoto, Saitama-ken (JP); Hidemi Ogihara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 10/743,870

(22) Filed: Dec. 24, 2003

(65) Prior Publication Data

US 2004/0159096 A1    Aug. 19, 2004

(30) Foreign Application Priority Data

Feb. 18, 2003    (JP) .............................. 2003-039361

(51) Int. Cl.
*F01N 3/00*    (2006.01)

(52) U.S. Cl. ............................ 60/286; 60/274; 60/276; 60/297; 60/303

(58) Field of Classification Search .................. 60/274, 60/276, 286, 295, 297, 301, 303
See application file for complete search history.

(56) References Cited

U.S. PATENT DOCUMENTS

| | | | | |
|---|---|---|---|---|
| 5,845,487 A * | 12/1998 | Fraenkle et al. | ............... | 60/274 |
| 6,119,448 A * | 9/2000 | Emmerling et al. | .......... | 60/274 |
| 6,427,439 B1 * | 8/2002 | Xu et al. | ....................... | 60/286 |
| 6,499,291 B2 * | 12/2002 | Lang et al. | ................... | 60/277 |
| 6,755,014 B2 * | 6/2004 | Kawai et al. | ................. | 60/286 |
| 6,761,025 B1 * | 7/2004 | Gladden | ..................... | 60/286 |

\* cited by examiner

*Primary Examiner*—Binh Q. Tran
(74) *Attorney, Agent, or Firm*—Arent Fox LLP

(57) ABSTRACT

An exhaust gas purifying apparatus and method for an internal combustion engine, and an engine control unit are provided for appropriately determining the amount of reducing agent supplied to a NOx selective reduction catalyst to ensure good exhaust gas characteristics. The exhaust gas purifying apparatus comprises an ECU; a NOx selective reduction catalyst for purifying NOx in exhaust gases in an exhaust pipe; a NOx sensor disposed in the exhaust pipe at a location downstream of the NOx selective reduction catalyst for detecting a NOx concentration in exhaust gases; and an injector for supplying the NOx selective reduction catalyst with ammonia produced in an ammonia production unit. The ECU determines the amount of ammonia injected to the NOx selective reduction catalyst by the injector such that an estimate of the NOx concentration detected by the NOx sensor reaches a minimum value.

18 Claims, 12 Drawing Sheets

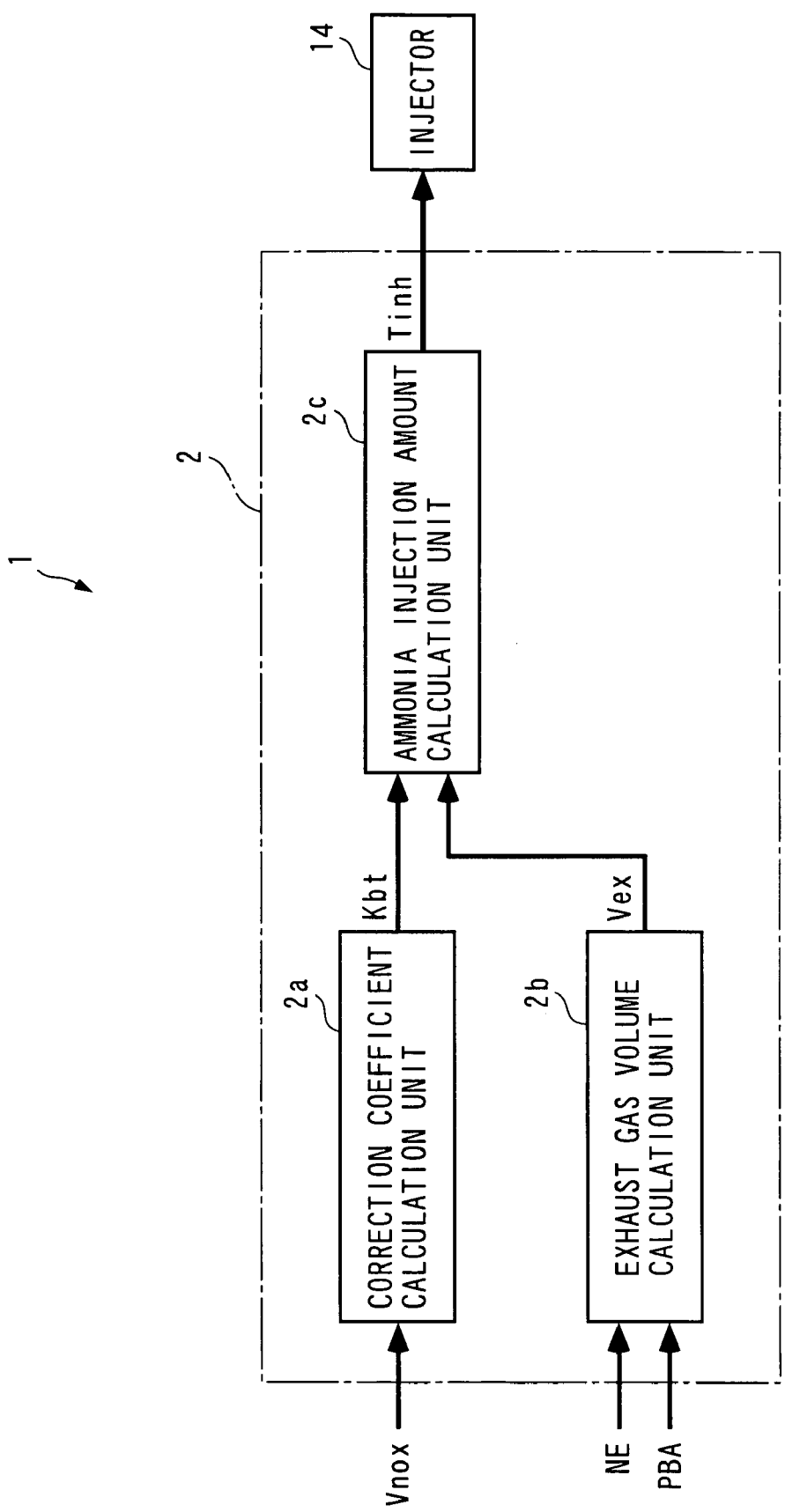

F I G. 6

$$Vnox\_hat(k) = A \cdot Kbt(k-d)^2 + B \cdot Kbt(k-d) + C \quad \cdots (3)$$

$$\theta(k) = \theta(k-1) + KP(k) \cdot ide(k) \quad \cdots (4)$$

$$\theta(k)^T = [A, B, C] \quad \cdots (5)$$

$$ide(k) = Vnox(k) - Vnox\_hat(k) \quad \cdots (6)$$

$$Vnox\_hat(k) = \theta(k-1)^T \cdot \zeta(k) \quad \cdots (7)$$

$$\zeta(k)^T = [Kbt(k-d)^2, Kbt(k-d), 1] \quad \cdots (8)$$

$$KP(k) = \frac{P(k) \cdot \zeta(k)}{1 + \zeta(k)^T \cdot P(k) \cdot \zeta(k)} \quad \cdots (9)$$

$$P(k+1) = \frac{1}{\lambda_1} \cdot \left( I - \frac{\lambda_2 \cdot P(k) \cdot \zeta(k) \cdot \zeta(k)^T}{\lambda_1 + \lambda_2 \cdot \zeta(k)^T \cdot P(k) \cdot \zeta(k)} \right) \cdot P(k) \quad \cdots (10)$$

I : UNIT MATRIX
$\lambda_1, \lambda_2$ : WEIGHT PARAMETERS

F I G. 8
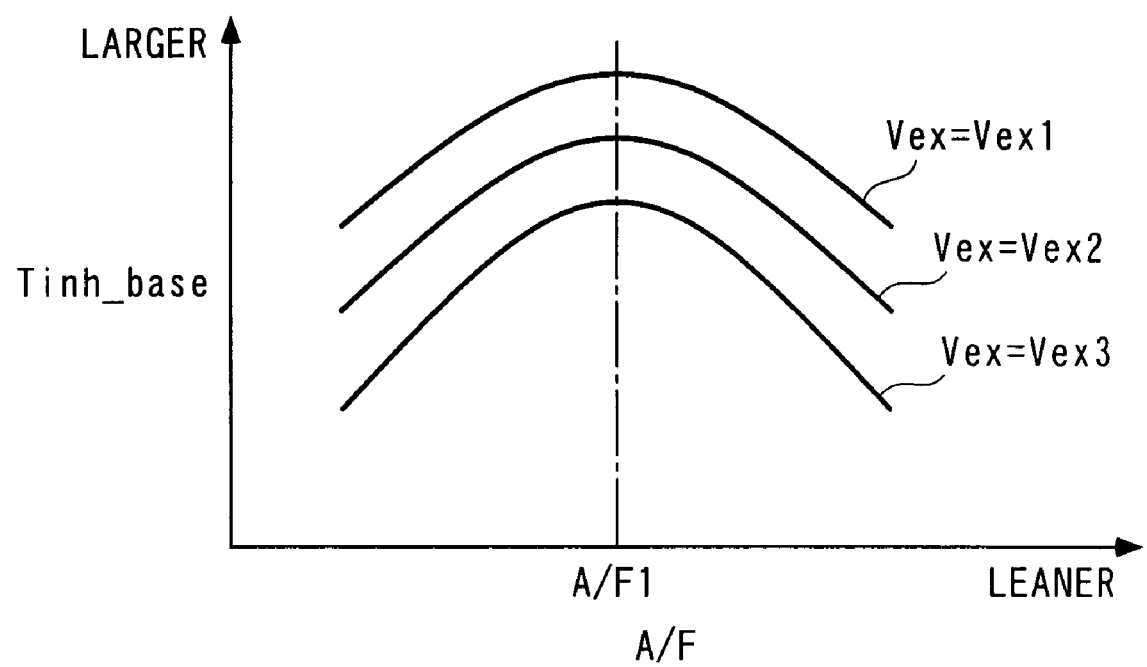

EXHAUST GAS PURIFYING APPARATUS AND METHOD FOR INTERNAL COMBUSTION ENGINE, AND ENGINE CONTROL UNIT

BACKGROUND OF THE INVENTION

1. Field of the Invention

The present invention relates to an exhaust gas purifying apparatus and method for an internal combustion engine, and an engine control unit for purifying nitrogen oxides (NOx) within exhaust gases which flow through an exhaust passage by a NOx selective reduction catalyst under the existence of a reducing agent.

2. Description of the Prior Art

The type of conventional exhaust gas purifying apparatus for an internal combustion engine mentioned above is known, for example, from Japanese Patent Publication No. 6-35816. This exhaust gas purifying apparatus injects ammonia as a reducing agent to a NOx selective reduction catalyst from an upstream location of an exhaust passage. This exhaust gas purifying apparatus, which is applied to a diesel engine equipped in a vehicle, comprises an ammonia production unit for producing ammonia; an ammonia supply unit for supplying produced ammonia to a location in the exhaust passage upstream of the NOx selective reduction catalyst; an ECU for controlling these components; and a NOx sensor disposed at a location of the exhaust passage upstream of the Nox selective reduction catalyst and connected to the ECU. The ammonia production unit, which generates ammonia from light oil and air, comprises a catalytic cracking reactor, an oxidization reactor, an ammonia synthesis reactor, and the like.

The ammonia supply unit in turn comprises an ammonia cylinder for storing ammonia produced by the ammonia production unit; and a control valve for controlling the amount of ammonia supplied from the ammonia cylinder to the exhaust passage. In this exhaust gas purifying apparatus, the ECU determines the amount of supplied ammonia necessary for NOx purification based on the NOx concentration in exhaust gases detected by the NOx sensor, and controls the opening of the control valve based on the determined amount of supplied ammonia.

The foregoing exhaust gas purifying apparatus employs the NOx selective reduction catalyst because it suffers less from sulfur poisoning and is less susceptible to the degradation of reduction performance, as compared with a NOx adsorption catalyst or a NOx occlusion catalyst, as well as because it eliminates a rich spike control for enriching the air/fuel ratio of an air-fuel mixture to recover the NOx adsorption performance (purification performance) of the catalyst to permit an increase in fuel economy.

In the conventional exhaust gas purifying apparatus described in Japanese Patent Publication No. 6-35816, since the NOx sensor is disposed in the exhaust passage at a location upstream of the NOx selective reduction catalyst, the amount of ammonia supplied to the NOx selective reduction catalyst is simply determined based on the NOx concentration of exhaust gases discharged from a diesel engine irrespective of how NOx is actually purified by the NOx selective reduction catalyst. As a result, the amount of ammonia supplied to the NOx selective reduction catalyst is not appropriately determined in accordance with the actual purification of NOx by the NOx selective reduction catalyst, possibly exacerbating the exhaust gas characteristics of the engine.

To solve the problem mentioned above, it is contemplated that the NOx sensor is positioned in the exhaust passage at a location downstream of the NOx selective reduction catalyst, such that the amount of ammonia supplied to the NOx selective reduction catalyst is determined on the basis of the NOx concentration detected by thus positioned NOx sensor. However, it has been generally confirmed in experiments that the Nox sensor characteristically reacts not only with NOx in exhaust gases but also with ammonia. Therefore, as an increase in ammonia not consumed in the NOx reduction causes a higher concentration of ammonia in exhaust gases downstream of the NOx selective reduction catalyst, the NOx sensor, if positioned in the exhaust passage at a location downstream of the NOx selective reduction catalyst, detects a value which apparently indicates a high NOx concentration. As a result, since the NOx sensor fails to correctly detect the NOx concentration in exhaust gases, the ECU does not determine an appropriate amount of ammonia supplied to the NOx selective reduction catalyst, possibly resulting in exacerbated exhaust gas characteristics of the engine.

SUMMARY OF THE INVENTION

The present invention has been made to solve the problem as mentioned above, and it is an object of the invention to provide an exhaust gas purifying apparatus and method for an internal combustion engine, and an engine control unit which are capable of appropriately determining the amount of a reducing agent supplied to a NOx selective reduction catalyst to ensure good exhaust gas characteristics.

To achieve the above object, according to a first aspect of the present invention, there is provided an exhaust gas purifying apparatus for an internal combustion engine which is characterized by comprising a NOx selective reduction catalyst disposed in an exhaust passage of the internal combustion engine for purifying NOx in exhaust gases flowing through the exhaust passage under the existence of a reducing agent; a NOx detector disposed in the exhaust pipe at a location downstream of the NOx selective reduction catalyst for detecting a NOx concentration in exhaust gases; a reducing agent supply unit for supplying the reducing agent to the NOx selective reduction catalyst; and supply amount determining means for determining the amount of the reducing agent supplied to the NOx selective reduction catalyst by the reducing agent supply unit such that the NOx concentration detected by the NOx detector reaches an extreme value.

According to this exhaust gas purifying apparatus for an internal combustion engine, the NOx detector detects the NOx concentration in the exhaust passage at a location downstream of the NOx selective reduction catalyst, and the supply amount determining means determines the amount of the reducing agent supplied to the NOx selective reduction catalyst such that the NOx concentration detected by the NOx detector reaches an extreme value. When the exhaust gas purifying apparatus employs a reducing agent such as ammonia or the like with which the NOx detector characteristically reacts, if an excessive amount of reducing agent is supplied to the NOx selective reduction catalyst, an increase in ammonia not consumed in the NOx reduction causes a higher concentration of ammonia in exhaust gases in downstream parts of the NOx selective reduction catalyst, so that the NOx sensor, positioned in the exhaust passage at a location downstream of the NOx selective reduction catalyst, detects a value which apparently indicates a high NOx concentration. On the other hand, if an excessively small amount of reducing agent is supplied to the NOx selective reduction catalyst, the NOx selective reduction catalyst suffers from degraded NOx reduction performance, so that the NOx concentration in exhaust gases at a location downstream of the NOx selective reduction catalyst presents a high value, causing the NOx detector to detect a high NOx concentration. For the reason set forth above, the NOx concentration detected by the NOx detector has an extreme value for a particular amount of reducing agent supplied to the NOx selective reduction catalyst. This fact has also been confirmed by experiments. Bearing this in mind, according to the exhaust gas purifying apparatus of the present invention, the supply amount determining means determines the supply amount of the reducing agent such that the NOx concentration detected by the NOx detector reaches the extreme value, so that the supply amount of the reducing agent can be appropriately determined in such a manner that both the ammonia concentration and NOx concentration in exhaust gases at a location downstream of the NOx selective reduction catalyst present low values in a well balanced state. As a result, high NOx purification performance can be ensured to securely provide good exhaust gas characteristics.

To achieve the above object, according to a second aspect of the invention, there is provided an exhaust gas purifying method for an internal combustion engine which is characterized by comprising the steps of purifying NOx in exhaust gases flowing through an exhaust passage using a NOx selective catalyst under the existence of a reducing agent; detecting a NOx concentration in exhaust gases; supplying the reducing agent to a NOx selective reduction catalyst; and determining the amount of the reducing agent supplied to the NOx selective reduction catalyst such that the detected NOx concentration reaches an extreme value.

This exhaust gas purifying method for an internal combustion engine provides the same advantageous effects as described above concerning the exhaust gas purifying method for an internal combustion engine according to the first aspect of the invention.

To achieve the above object, according to a third aspect of the invention, there is provided an engine control unit including a control program for causing a computer to execute an exhaust gas purifying method for an internal combustion engine.

The engine control unit is characterized in that the control program causes the computer to instruct an exhaust gas purifying apparatus to purify NOx in exhaust gases flowing through an exhaust passage under the existence of a reducing agent; instruct a NOx sensor to detect a NOx concentration in exhaust gases; instruct a reducing agent supply unit to supply the reducing agent to a NOx selective reduction catalyst; and determine the amount of the reducing agent supplied to the NOx selective reduction catalyst such that the detected NOx concentration reaches an extreme value.

This engine control unit provides the same advantageous effects as described above concerning the exhaust gas purifying apparatus according to the first aspect of the invention.

Preferably, the exhaust gas purifying apparatus for an internal combustion engine described above further comprises an upstream NOx detector disposed in the exhaust passage at a location upstream of the NOx selective reduction catalyst for detecting the NOx concentration in exhaust gases; and exhaust gas volume detecting means for detecting an exhaust gas volume of the internal combustion engine, wherein the supply amount determining means includes basic supply amount determining means for determining a basic supply amount of the reducing agent to the NOx selective reduction catalyst in accordance with the NOx concentration detected by the upstream NOx detector and the detected exhaust gas volume; and correcting means for correcting the determined basic supply amount of the reducing agent such that the NOx concentration detected by the NOx detector reaches a maximum value.

According to this preferred embodiment of the exhaust gas purifying apparatus for an internal combustion engine, the upstream NOx detector detects the NOx concentration in the exhaust passage at a location upstream of the NOx selective reduction catalyst, so that the basic supply amount of the reducing agent to the NOx selective reduction catalyst is determined in accordance with the detected NOx concentration and exhaust gas volume. Even when the exhaust gas purifying apparatus employs a reducing agent such as ammonia with which the NOx detector and upstream NOx detector react, the upstream NOx detector, disposed at a location upstream of the position at which the NOx selective reduction catalyst is supplied with the reducing agent, can accurately detect only the NOx concentration in exhaust gases without being affected by the reducing agent, thereby making it possible to appropriately determine the basic supply amount of the reducing agent to the NOx selective reduction catalyst only in accordance with the NOx concentration in exhaust gases. Further, since the basic supply amount determined in this way is corrected by the correcting means such that the NOx concentration detected by the NOx detector disposed at a location downstream of the NOx selective reduction catalyst reaches the extreme value, the supply amount of the reducing agent can be appropriately determined in such a manner that both the ammonia concentration and NOx concentration in exhaust gases at a location downstream of the NOx selective reduction catalyst present low values in a well balanced state. Consequently, the exhaust gas purifying apparatus can appropriately determine the amount of the reducing agent supplied to the NOx selective reduction catalyst with high accuracy to further improve the NOx purification performance. It should be noted that the "detection of an exhaust gas volume" herein referred to is not limited to detecting an exhaust gas volume by a sensor, but includes calculating an exhaust gas volume by a program.

Preferably, the exhaust gas purifying method for an internal combustion engine described above, further comprises the steps of detecting the NOx concentration in exhaust gases in the exhaust passage at a location upstream of the NOx selective reduction catalyst; and detecting an exhaust gas volume of the internal combustion engine, wherein the step of determining the amount of the reducing agent includes determining a basic supply amount of the reducing agent to the NOx selective reduction catalyst in accordance with the NOx concentration detected at the location upstream of the NOx selective reduction catalyst and the detected exhaust gas volume; and correcting the determined basic supply amount of the reducing agent such that the detected NOx concentration reaches an extreme value.

This preferred embodiment of the exhaust gas purifying method provides the same advantageous effects as provided by the corresponding preferred embodiment of the exhaust gas purifying apparatus.

Preferably, in the engine control unit described above, wherein the control program further causes the computer to instruct an upstream NOx detector to detect the NOx concentration in exhaust gases a location upstream of the NOx selective reduction catalyst; instruct exhaust gas volume detecting means to detect an exhaust gas volume of the internal combustion engine; determine a basic supply amount of the reducing agent to the NOx selective reduction catalyst in accordance with the NOx concentration detected at the location upstream of the NOx selective reduction catalyst and the detected exhaust gas volume; and correct the determined basic supply amount of the reducing agent such that the detected NOx concentration reaches an extreme value.

This preferred embodiment of the engine control unit provides the same advantageous effects as provided by the corresponding preferred embodiment of the exhaust gas purifying apparatus.

Preferably, the exhaust gas purifying apparatus for an internal combustion engine described above further comprises a reducing agent production unit for producing the reducing agent using at least a fuel for the internal combustion engine as a raw material.

According to this preferred embodiment of the exhaust gas purifying apparatus for an internal combustion engine, the reducing agent production unit produces the reducing agent using at least a fuel for the internal combustion engine as a raw material, so that by using a reducing agent made only from the fuel or a reducing agent made from the fuel and air, the reducing agent production unit can produce the reducing agent only by supplementing the fuel, making it possible to omit the supplement of the reducing agent and to eliminate an infrastructure for supplementing the reducing agent. This results in improved convenience and product value.

Preferably, the exhaust gas purifying method for an internal combustion engine described above further comprises the step of producing the reducing agent using at least a fuel for the internal combustion engine as a raw material.

This preferred embodiment of the exhaust gas purifying method provides the same advantageous effects as provided by the corresponding preferred embodiment of the exhaust gas purifying apparatus.

Preferably, in the engine control unit described above, the control program further causes the computer to instruct a reducing agent production unit to produce the reducing agent using at least a fuel for the internal combustion engine as a raw material.

This preferred embodiment of the engine control unit provides the same advantageous effects as provided by the corresponding preferred embodiment of the exhaust gas purifying apparatus.

Preferably, in the exhaust gas purifying apparatus for an internal combustion engine described above, the reducing agent is ammonia.

According to this preferred embodiment of the exhaust gas purifying apparatus for an internal combustion engine, since the reducing agent is ammonia, the reducing agent can be produced using gasoline or light oil, which is generally used as a fuel for an internal combustion engine, as a raw material.

Preferably, in the exhaust gas purifying method for an internal combustion engine described above, the reducing agent is ammonia.

This preferred embodiment of the exhaust gas purifying method provides the same advantageous effects as provided by the corresponding preferred embodiment of the exhaust gas purifying apparatus.

Preferably, in the engine control unit described above, the reducing agent is ammonia.

This preferred embodiment of the engine control unit provides the same advantageous effects as provided by the corresponding preferred embodiment of the exhaust gas purifying apparatus.

BRIEF DESCRIPTION OF THE DRAWINGS

FIG. 3 is a block diagram generally illustrating the configuration of the exhaust gas purifying apparatus;

FIG. 6 shows an equation for calculating the estimate Vnox_hat, and equations for describing an algorithm for calculating a regression coefficient vector $\theta$ thereof;

FIG. 8 is a diagram showing an exemplary map for use in a calculation of a basic injection amount Tinh_base at step 6 in the flow chart of FIG. 7;

DETAILED DESCRIPTION OF THE EMBODIMENT

Figure 1:
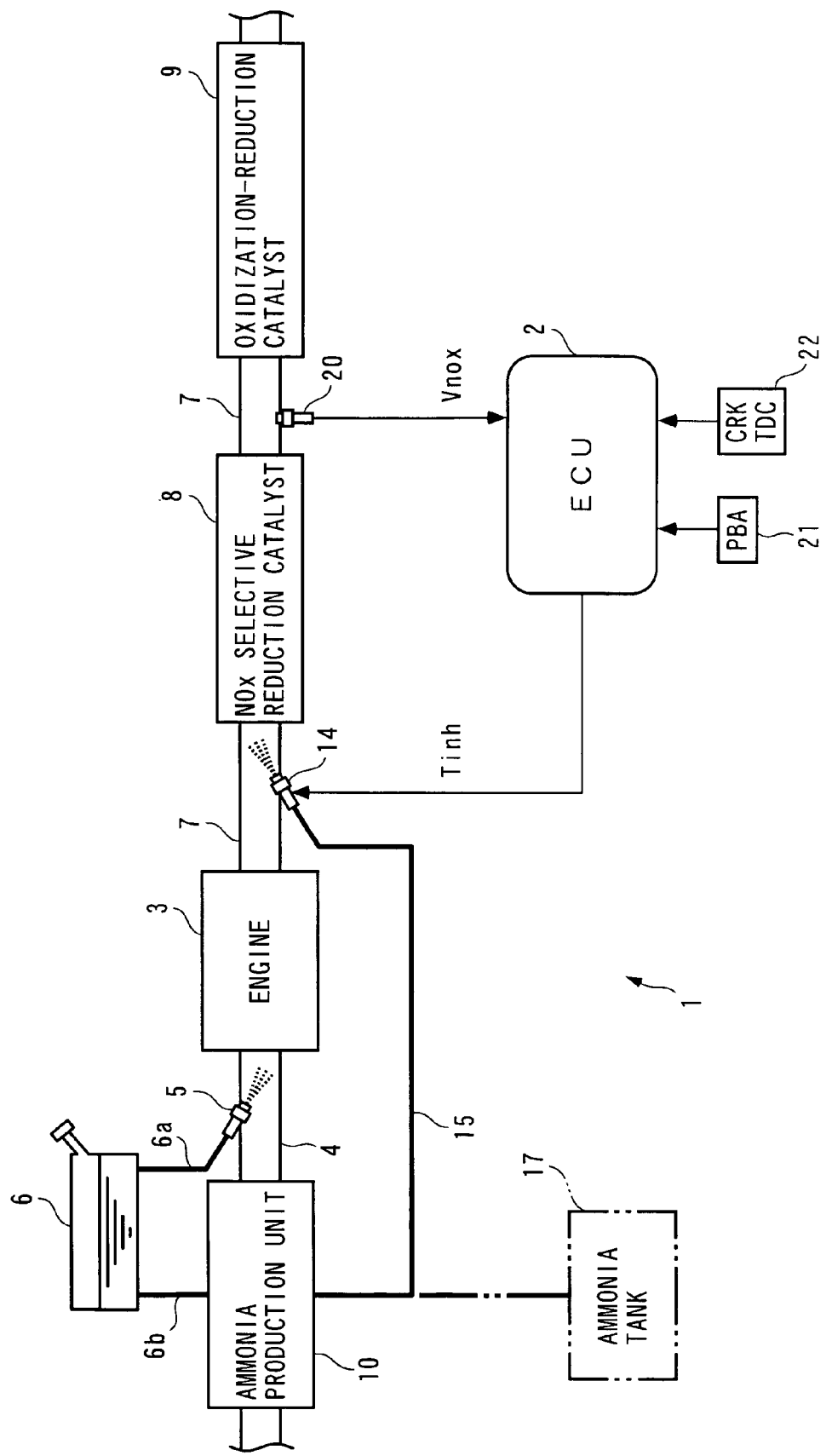
FIG. 1 is a block diagram generally illustrating the configuration of an exhaust gas purifying apparatus according to a first embodiment of the present invention, and an internal combustion engine which applies the exhaust gas purifying apparatus.

In the following, an exhaust gas purifying apparatus for an internal combustion engine according to a first embodiment of the present invention will be described with reference to the accompanying drawings. FIG. 1 generally illustrates the configuration of an exhaust gas purifying apparatus 1 according to the first embodiment, and an internal combustion engine (hereinafter called the "engine") 3 which applies the exhaust gas purifying apparatus 1. As illustrated, the exhaust gas purifying apparatus 1 comprises an ECU 2; an ammonia production unit 10 for producing ammonia; an injector 14 for injecting ammonia; and the like. The ECU 2 controls the amount of ammonia (NH$_3$) injected by the injector 14, as later described.

The engine 3 is a gasoline engine of lean burn operation type, and is equipped in a vehicle, not shown. An injector 5 is provided halfway in an intake pipe 4 of the engine 3 for injecting a fuel. The injector 5 is connected to a fuel tank 6 through a fuel supply passage 6a. A valve opening time, i.e., the amount of fuel injected by the injector 5 is controlled by the ECU 2.

A NOx selective reduction catalyst 8 and an oxidization-reduction catalyst 9 are provided halfway in ah exhaust pipe 7 of the engine 3 in this order from the upstream side. The NOx selective reduction catalyst 8 selectively reduces nitrogen oxides (NOx) in exhaust gases in an atmosphere in which ammonia exists as a reducing agent, and is comprised, for example, of a vanadium-tungsten-titanium based catalyst. The oxidization-reduction catalyst 9, which is comprised of a so-called three-way catalyst, purifies NOx, carbon monoxide (CO), and hydrocarbons (HC) in exhaust gases.

A Nox sensor 20 is also provided in the exhaust pipe 7 between the NOx selective reduction catalyst 8 and oxidization-reduction catalyst 9. The NOx sensor 20 detects a NOx concentration in exhaust gases which have passed the NOx selective reduction catalyst 8, and outputs a detection signal indicative of the detected NOx concentration to the ECU 2. The NOx sensor 20 is of a so-called limiting current type which has a first and a second chamber, an oxygen pumping electrode, an oxygen concentration detecting electrode (none of which is shown), and the like within the sensor device. After the oxygen concentration in exhaust gases is reduced in the first chamber, the exhaust gases with a reduced oxygen concentration is applied into the second chamber, where NOx in the exhaust gases is decomposed, and the NOx concentration in the exhaust gases is detected based on the concentration of oxygen which is generated during the decomposition.

Figure 2:
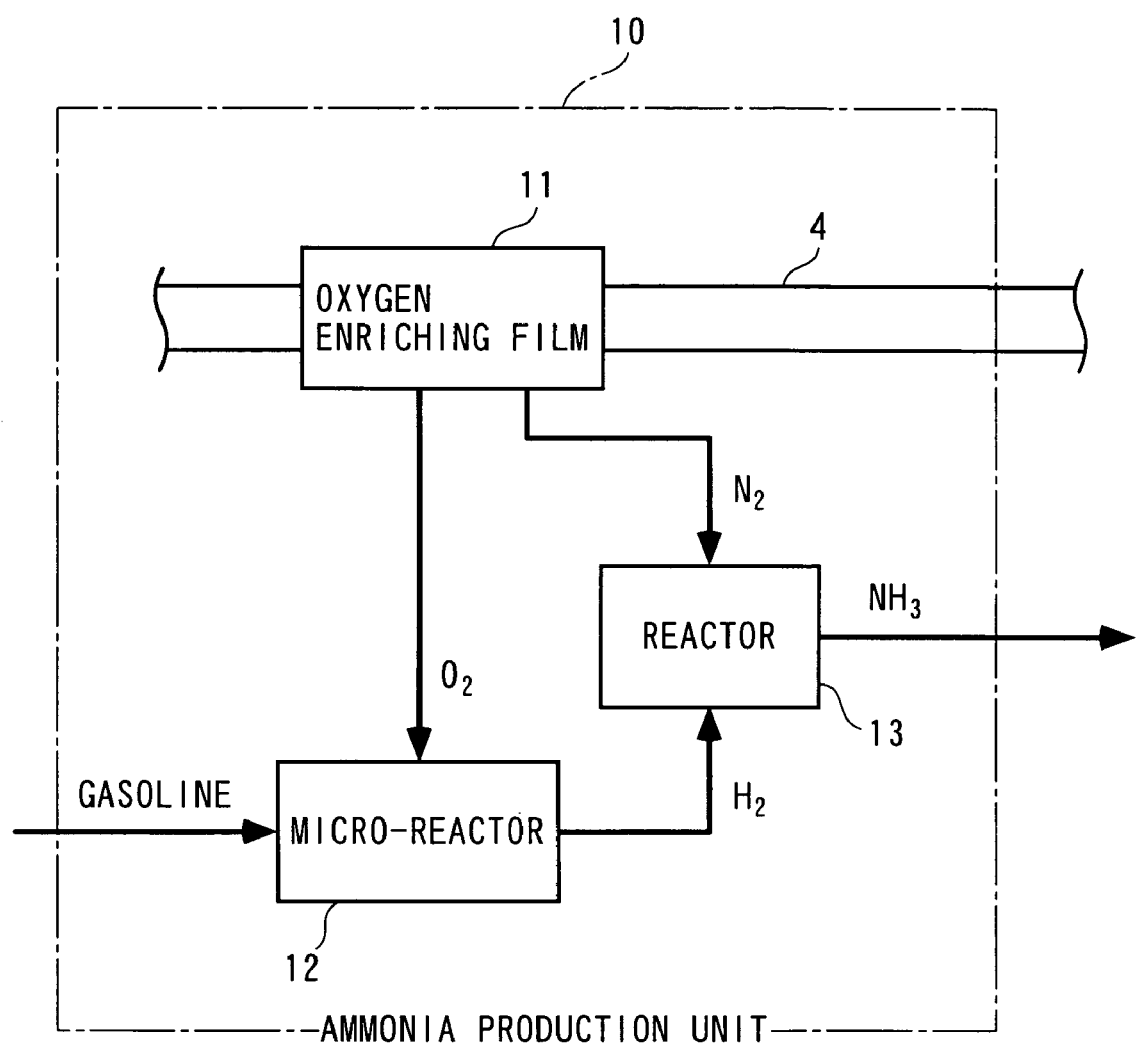
FIG. 2 is a block diagram generally illustrating the configuration of an ammonia production unit in the exhaust gas purifying apparatus.

The ammonia production unit 10, which serves as a reducing agent production unit, is connected to the fuel tank 6 through the fuel supply passage 6b, and also connected to the injector 14 through an ammonia supply passage 15. As illustrated in FIG. 2, the ammonia production unit 10 comprises an oxygen enriching layer 11, a micro-reactor 12, a reactor 13, and the like.

The oxygen enriching layer 11, which separates air flowing thereinto into a high-concentration nitrogen gas (nitrogen rich gas) and a high-concentration oxygen gas (oxygen rich gas), is provided in the intake pipe 4 at a location upstream of a throttle valve (not shown). The oxygen gas generated by the oxygen enriching layer 11 is supplied to the micro-reactor 12, while the nitrogen gas is supplied to the reactor 13.

The micro-reactor 12 also reforms gasoline supplied from the fuel tank 6 to generate a high-concentration hydrogen gas. Specifically, the micro-reactor 12 employs a rhodium-based catalyst and relies on autothermal reforming for simultaneously conducting a partial oxidization reaction for reacting the gasoline with the oxygen gas supplied from the oxygen enriching film 11, and a hydrogen reforming reaction for reacting the gasoline with water vapor to generate a mixture gas of hydrogen and carbon monoxide. The micro-reactor 12 also shift-reacts the mixture gas to generate a high-concentration hydrogen gas. The hydrogen gas generated in this way is supplied to the reactor 13.

The reactor 13 produces ammonia by vapor-phase synthesis through a ruthenium-based catalyst. Specifically, the reactor 13 produces ammonia by vapor-phase synthesizing the nitrogen gas from the oxygen enriching layer 11 with the hydrogen gas from the micro-reactor 12. In the foregoing manner, the ammonia production unit 10 uses the gasoline and air as materials to produce ammonia. The ammonia produced by the ammonia production unit 10 is pumped for supply to the injector 14 through an ammonia supply passage 15.

The injector 14 (reducing agent supply unit) is provided in the exhaust pipe 7 at a location downstream of the NOx selective reduction catalyst 8, and is driven by a driving signal from the ECU 2 to inject ammonia into the exhaust pipe 7 toward the NOx selective reduction catalyst 8. A valve opening time, i.e., the amount Tinh of ammonia injected by the injector 14 is calculated by the ECU 2, as later described.

The ECU 2 is electrically connected to an absolute intake pipe internal pressure sensor 21 and a crank angle sensor 22. The absolute intake pipe internal pressure sensor 21 (exhaust gas volume detecting means), which may be comprised of a semiconductor pressure sensor or the like, is provided in the intake pipe 4 at a location upstream of the injector 5 for detecting an absolute intake pipe internal pressure PBA to output a detection signal indicative of the absolute intake pipe internal pressure PBA to the ECU 2.

The crank angle sensor 22 (exhaust as volume detecting means) 22 in turn is composed of a magnet rotor and an MRE pickup (neither of which is shown) in combination, and outputs a CRK signal and a TDC signal, both of which are pulse signals, to the ECU 2 in response to the rotation of a crank shaft, not shown.

One pulse of the CRK signal is outputted every predetermined crank angle (for example, every 30°), so that the ECU 2 calculates the engine rotational speed NE of the engine 3 based on the CRK signal. The TDC signal in turn is a signal which indicates that the piston (not shown) of each cylinder is at a predetermined crank angle position near TDC (top dead center) at the start of an intake stroke, and one pulse of the TDC signal is outputted every predetermined crank angle (for example, every 180° for a four-cylinder engine).

The ECU 2 is based on a microcomputer which comprises a CPU, a RAM, a ROM, an I/O interface, and the like. The ECU 2 controls the ammonia injection amount Tinh of the injector 14 in accordance with the respective detection signals sent from the various sensors 20–24, as later described. The ECU 2 also calculates a target air/fuel ratio A/F for an air/fuel mixture which should be supplied to the engine 3, and controls the amount of fuel injected by the injector 5 such that the air/fuel ratio of the air/fuel mixture matches the target air-fuel ratio A/F.

As illustrated in FIG. 3, the exhaust gas purifying apparatus 1 comprises a correction coefficient calculation unit 2a, an exhaust gas volume calculation unit 2b, an ammonia injection amount calculation unit 2c, and the like, all of which may be specifically implemented by the ECU 2. The correction coefficient calculation unit 2a calculates a correction coefficient Kbt based on the detected value Vnox from the NOx sensor 10 in accordance with an algorithm, later described.

The exhaust gas volume calculation unit 2b in turn calculates an exhaust gas volume Vex in accordance with the following equation (1):

$$Vex = (NE/1500) \cdot PBA \cdot SVPRA \tag{1}$$

where SVPRA is a predetermined coefficient previously determined by the displacement of the engine 3.

Further, the ammonia injection amount calculation unit 2c calculates a basic injection amount Tinh_base (basic supply amount for the reducing agent) by searching a map shown in FIG. 8, later described, in accordance with the exhaust gas volume Vex and the target air/fuel ratio A/F of the air/fuel mixture, and calculates the ammonia injection amount Tinh using the basic injection amount Tinh_base and correction coefficient Kbt in accordance with the following equation (2):

$$Tinh(k)=Tinh\_base\ (k)\cdot Kbt(k) \qquad (2)$$

where k represents a discretized time, and each discrete data suffixed by a symbol (k) indicates data which is sampled every predetermined time. This is applied to following discrete data (time-series data) as well.

Figure 4A:
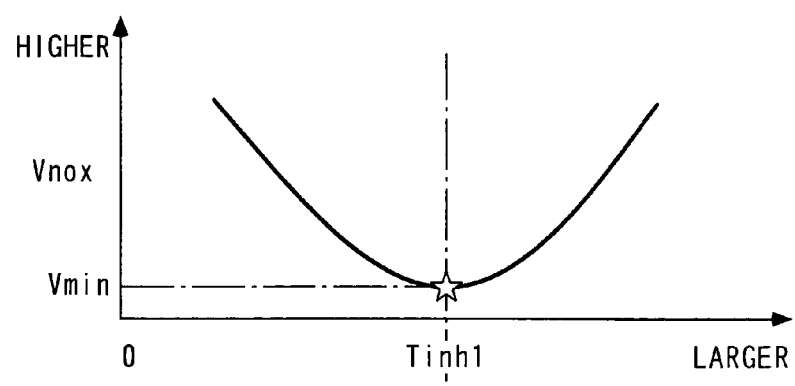
FIG. 4A is a graph showing the result of an exemplary measurement made on a detected value Vnox as the amount Tinh of injected ammonia is varied.
Figure 4B:
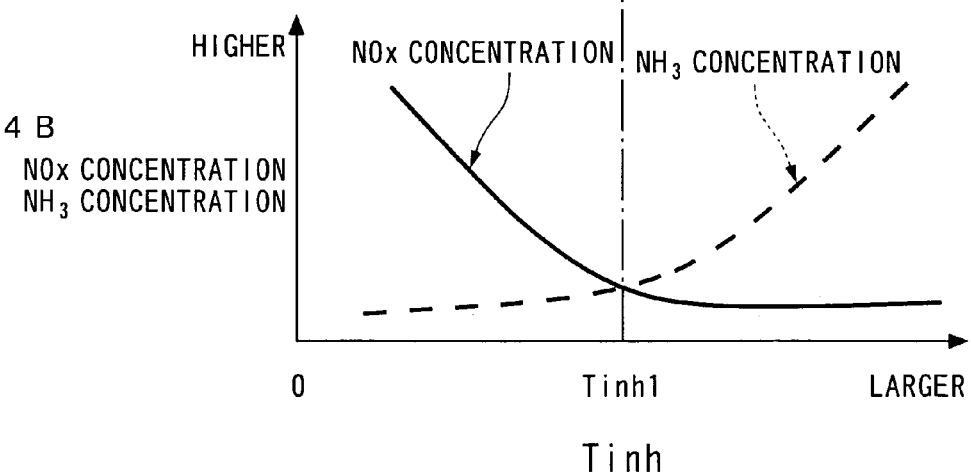
FIG. 4B is a graph showing the result of exemplary measurements made on an ammonia concentration and a nitrogen oxide concentration in exhaust gases which have passed through a NOx selective reduction catalyst.

Next, description will be made on an algorithm for calculating the correction coefficient Kbt in the correction coefficient calculation unit 2a. FIG. 4A is a graph showing the result of an exemplary measurement made on the detected value Vnox as the NOx selective reduction catalyst 8 is supplied with the varied amount Tinh of injected ammonia. The graph in FIG. 4A shows that the NOx concentration in exhaust gases is higher as the detected value Vnox detected by the NOx sensor 2 is larger. FIG. 4B is a graph showing the result of exemplary measurements made on the ammonia concentration and nitrogen oxide concentration in exhaust gases at a location downstream of the NOx selective reduction catalyst 8 when the ammonia injection amount Tinh is varied.

As shown in FIG. 4A, it is recognized that the detected value Vnox presents a minimum value Vmin when the ammonia injection amount Tinh is set at a predetermined value Tinh1, and presents a larger value as the ammonia injection amount Tinh is larger than or smaller than the predetermined value Tinh1. This result is attributable to the following reason. Specifically, the NOx sensor 20 generally has the characteristics of reacting not only with NOx but also with ammonia in exhaust gases. Thus, as shown in FIG. 4B, as an increase in ammonia not consumed in the NOx reduction, caused by an excess of the ammonia injection amount Tihn, results in a higher concentration of ammonia in exhaust gases downstream of the NOx selective reduction catalyst 8, so that the detected value Vnox apparently indicates a higher value, i.e., a value which indicates a higher NOx concentration. On the other hand, an excessively small ammonia injection amount Tinh causes degraded NOx reduction performance of the NOx selective reduction catalyst 8, so that the NOx concentration in exhaust gases is higher in the downstream parts of the NOx selective reduction catalyst 8, resulting in the detected value Vnox indicating a high NOx concentration.

Figure 5A:
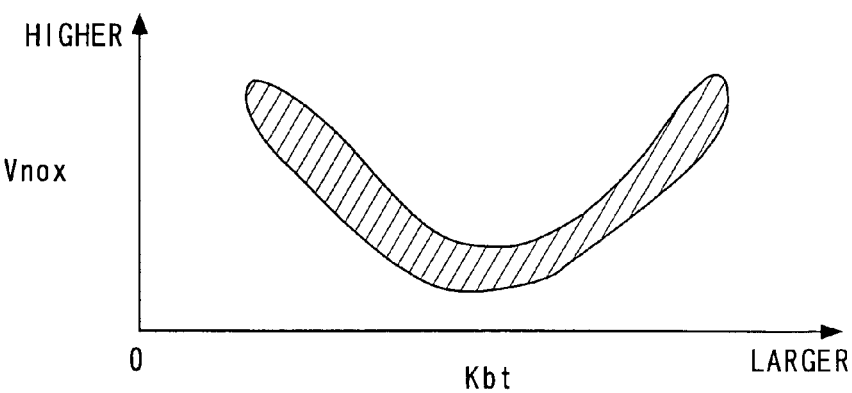
FIG. 5A is a graph showing the relationship between a correction coefficient Kbt and the detected value Vnox.

As described above, since the detected value Vnox of the NOx sensor 20 is affected not only by the NOx concentration but also by the ammonia concentration, the NOx concentration cannot be appropriately controlled even if the ammonia injection amount Tinh is controlled in accordance with a general feedback control approach based on the detected value Vnox. It is understood, in consideration of the foregoing characteristics of the NOx sensor 20, that the NOx concentration can be optimally controlled if the ammonia injection amount Tinh is set to bring the detected value Vnox to the minimum value. Further, in the first embodiment, since the basic injection amount Tinh_base of the ammonia injection amount Tinh is calculated on the basis of the exhaust gas volume Vex, the ammonia injection amount Tihn also follows variations in the exhaust gas volume Vex, and simultaneously, the purification activity of the NOx selective reduction catalyst 8, in other words, an optimal ratio of NOx in exhaust gases purified by the NOx selective reduction catalyst 8 to the ammonia also varies following the exhaust gas volume Vex. Consequently, the correction coefficient Kbt for correcting the ammonia injection amount Tinh is also affected by the exhaust gas volume Vex to present variations. For this reason, the detected value Vnox of the NOx sensor 20 presents a value in a range indicated by hatchings in FIG. 5A following the correction coefficient Kbt. This has been confirmed by an experiment. In other words, it is understood that an approximate or estimate of the detected value Vnox can be calculated by a quadratic (regression equation) which has the detected value Vnox of the NOx sensor 20 as a dependent variable and the correction coefficient Kbt as an independent variable (see FIG. 5B).

Accordingly, the correction coefficient calculation unit 2a in the first embodiment defines an estimate Vnox_hat(k) of the detected value Vnox of the NOx sensor 20 as a value calculated by a quadratic regression equation shown in Equation (3) in FIG. 6, and calculates regression coefficients A, B in Equation (3), and a vector θ (k) in a constant term C in Equation (3) (hereinafter called the "regression coefficient vector") by a sequential least square method as represented by Equations (4)–(10) in FIG. 6. In Equation (3), "d" represents a dead time taken by exhaust gases discharged from each cylinder to reach the NOx sensor 20, and is previously set at a predetermined constant value (for example, a value corresponding to one combustion cycle) in the first embodiment. Alternatively, the dead time d may be set in accordance with a particular operating condition of the engine 3 (engine rotational speed NE or the like).

In Equation (4) in FIG. 6, KP(k) represents a vector of a gain coefficient, and ide(k) represents an error which is calculated by Equations (6)–(8) in FIG. 6. ζ (k) in Equation (7) represents a vector of a correction coefficient defined as in Equation (8). Further, the vector KP(k) of the gain coefficient is calculated by Equation (9) in FIG. 6, and P(k) in Equation (9) is a cubic square matrix defined by Equation (10) in FIG. 6.

The regression coefficient vector θ (k) is calculated such that the error ide(k) converges to zero in accordance with the algorithm represented by the foregoing equations (4)–(10). In other words, the regression coefficient vector θ (k) is calculated such that the estimate Vnox_hat(k) converges to the detected value Vnox of the NOx sensor 20.

Figure 5B:
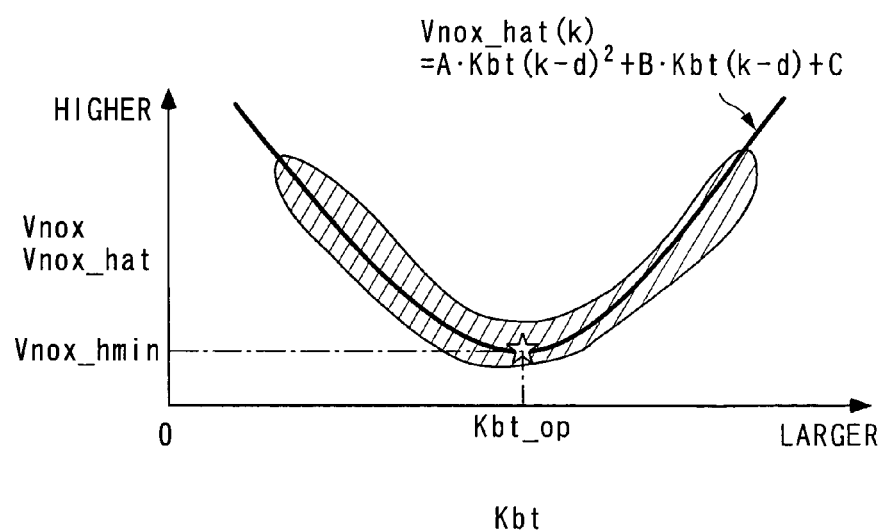
FIG. 5B is a graph showing the relationship among the correction coefficient Kbt, detected value Vnox, and an estimate Vnox_hat of the detected value.

Also, since the estimate Vnox_hat(k) is calculated by the quadratic represented by Equation (3), a minimum value Vnox_hmin appears when the correction coefficient Kbt(k−d) takes a predetermined value Kbt_op [=−B/(2A)] (see FIG. 5B). Accordingly, in the first embodiment, a current value Kbt(k) for the correction coefficient is calculated in accordance with the following Equation (11) such that the estimate Vnox_hat(k) is brought to its minimum value Vnox_hmin. Values for use as regression coefficients A, B in Equation (11) are calculated at a timing of discrete time k−d:

$$Kbt(k)=Kbt\_op(k-d)=-B/(2A) \qquad (11)$$

Figure 7:
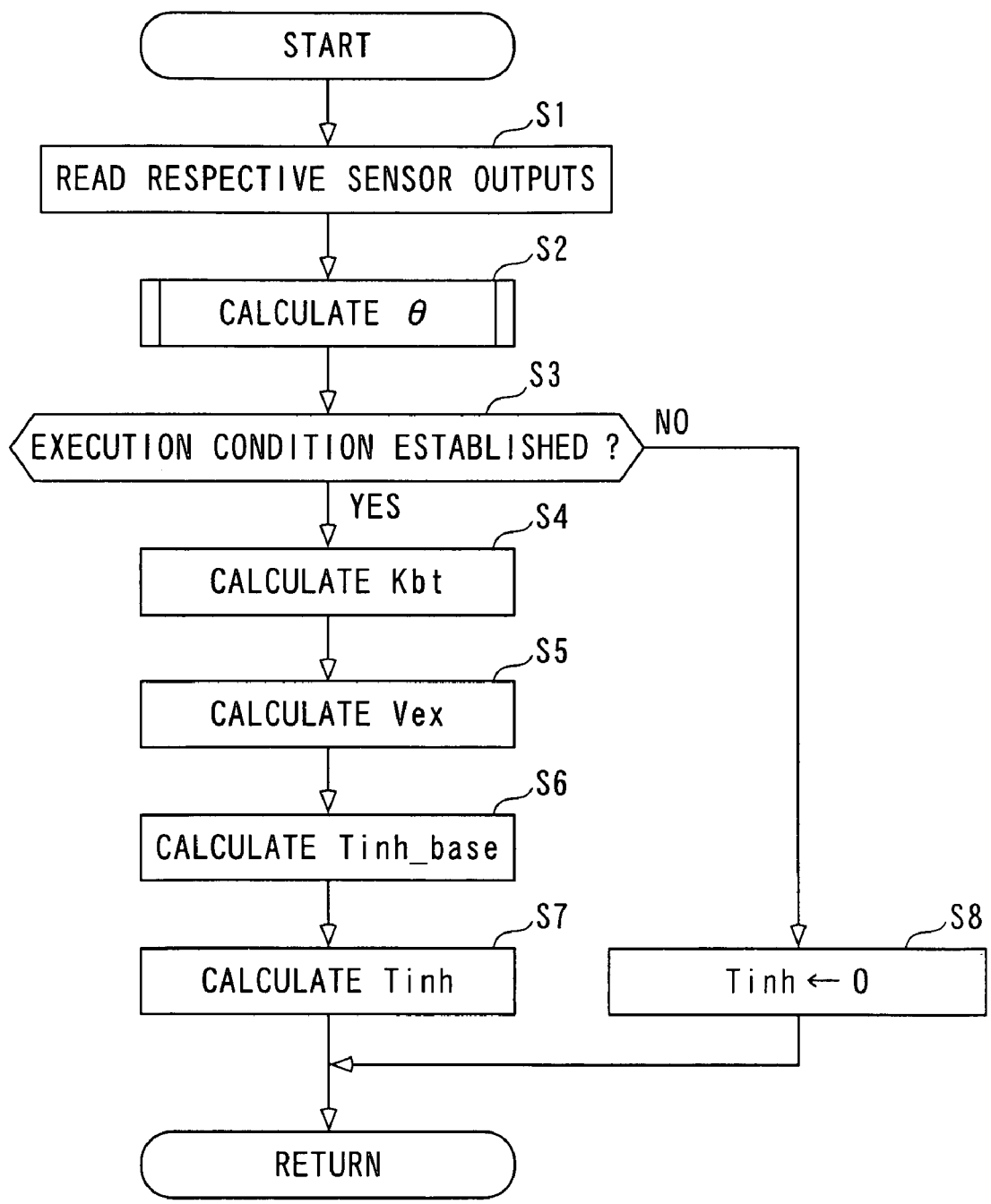
FIG. 7 is a flow chart illustrating a routine for controlling ammonia injection in the exhaust gas purifying apparatus.
Figure 9:
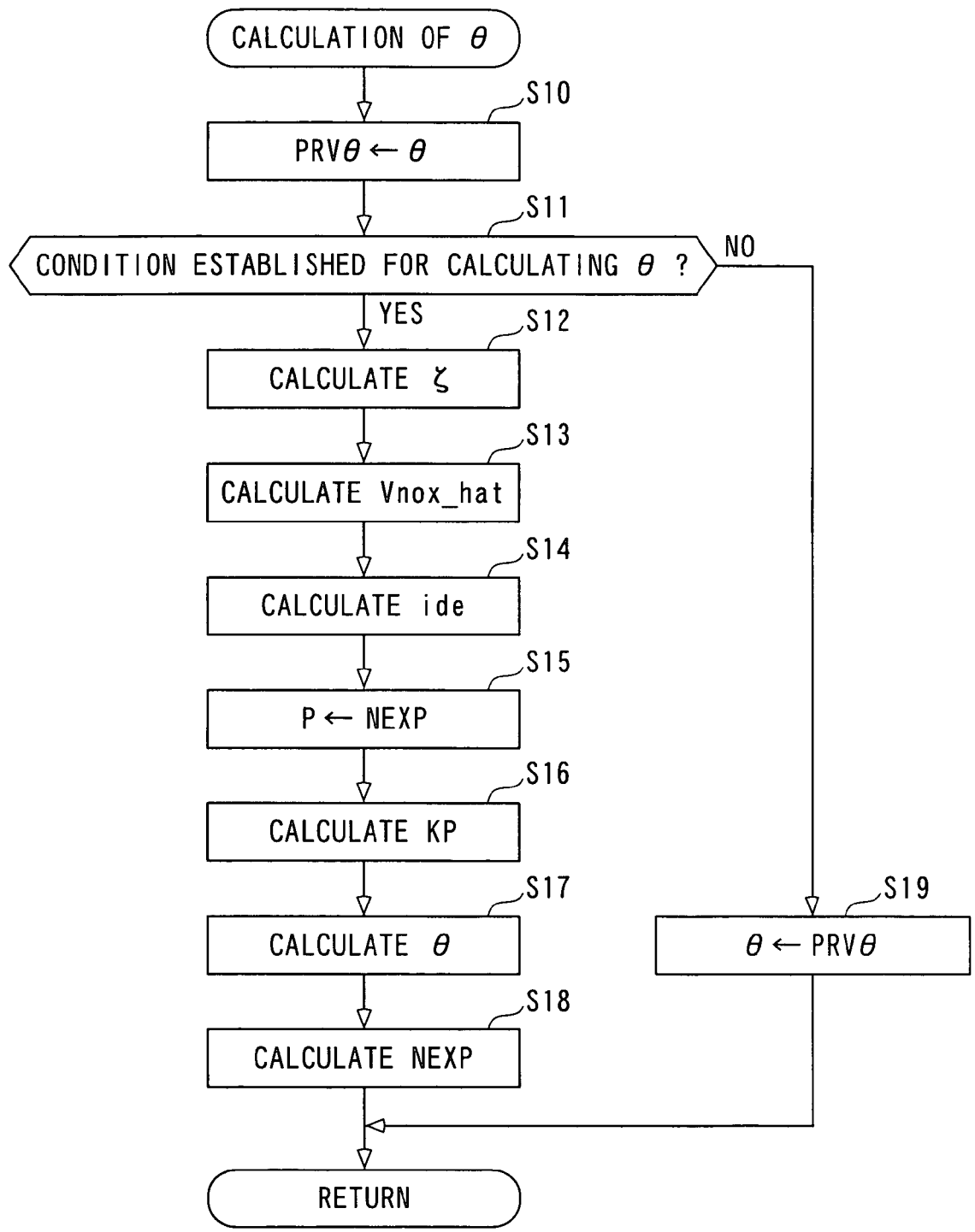
FIG. 9 is a flow chart illustrating a subroutine for calculating a regression coefficient vector $\theta$ at step 2 in the flow chart of FIG. 7.

In the following, a routine for controlling the ammonia injection amount, executed by the ECU 2, will be described with reference to FIGS. 7 to 9. It should be noted that in the following description, the symbol (k) indicative of a current value is omitted as appropriate. FIG. 7 illustrates the main routine of the control which is executed as an interrupt in synchronism with the TDC signal inputted to the ECU 2. This routine calculates the ammonia injection amount Tinh, as described below.

First, at step 1 (labeled as "S1" in the figure. The same designation applies to the following description), the ECU 2 reads the outputs of the various sensors 20–22 mentioned above, and stores the read data in the RAM. The routine next proceeds to step 2, where the ECU 2 calculates the regression coefficient vector θ in a manner described below.

The routine next proceeds to step 3, where it is determined whether or not the condition has been established for the injector 14 to inject ammonia. This determination is made based on a particular operating condition of the engine 3 (engine rotational speed NE, absolute intake pipe internal pressure PBA, or the like). If the result of the determination at step 3 is YES, indicating that the condition has been established for injecting ammonia, the routine proceeds to step 4, where the ECU 2 calculates the correction coefficient Kbt in accordance with the aforementioned equation (11).

Next, the routine proceeds to step 5, where the ECU 2 calculates the exhaust gas volume Vex in accordance with the aforementioned equation (1). Subsequently, the routine proceeds to step 6, where the ECU 2 searches a map shown in FIG. 8 in accordance with the exhaust gas volume Vex calculated at step 5 and the target air/fuel ratio A/F of the air/fuel mixture to retrieve the basic injection amount Tinh_base. In this map, three predetermined values Vex1–Vex3 of the exhaust gas volume Vex are set in a relationship represented by Vex3<Vex2<Vex1. In other words, the map shows that the basic injection amount Tinh_base is set at a larger value as the exhaust gas volume Vex is larger. This is because the total amount of NOx in exhaust gases increases as the exhaust gas volume Vex is larger. Also, the basic injection amount Tinh_base is set to have the largest value when the target air/fuel ratio A/F is at a predetermined value A/F1 (for example, 16.0) on the leaner side from the stoichiometric air/fuel ratio. This is because the total amount of NOx in exhaust gases is the largest when the target air/fuel ratio A/F reaches the predetermined value A/F1 on the leaner side from the stoichiometric air/fuel ratio.

Next, the routine proceeds to step 7, where the ECU 2 calculates the ammonia injection amount Tinh using the correction coefficient Kbt and basic injection amount Tinh_base calculated at steps 4, 6, respectively, in accordance with the aforementioned Equation (2), followed by termination of the routine for controlling the ammonia injection.

On the other hand, if the result of the determination at step 3 is NO, indicating that the condition is not established for injecting ammonia, the routine proceeds to step 8, where the ECU 2 sets the ammonia injection amount Tinh to zero, followed by termination of the routine for controlling the ammonia injection.

Next, the calculation of the regression coefficient vector θ at step 2 will be described in greater detail with reference to a subroutine illustrated in FIG. 9. In this subroutine, first, at step 10, ECU 2 set a calculated value θ of the regression coefficient vector in the preceding loop, which is stored in the RAM, as the preceding value PRVθ [=θ(k−1)].

Next, the subroutine proceeds to step 11, where it is determined whether or not the condition has been established for calculating the regression coefficient vector θ. Specifically, this determination is made based on a particular operating condition of the engine 3 (for example, engine rotational speed NE, absolute intake pipe internal pressure PBA, or the like). If the result of the determination at step 11 is YES, indicating that the condition has been established for calculating the regression coefficient vector θ, the subroutine proceeds to step 12, where the ECU 2 calculates the vector ζ of the correction vector in accordance with the aforementioned Equation (8), and then calculates the estimate Vnox_hat in accordance with the aforementioned Equation (7) at step 13.

The subroutine next proceeds to step 14, where the ECU 2 calculates the error ide in accordance with the aforementioned equation (6), and then sets a calculated value for the next value NEXP [=P(k+1)] of the square matrix in the preceding loop, stored in the RAM, as its current value P.

Next, the subroutine proceeds to step 16, where the ECU 2 calculates the vector KP of the gain coefficient in accordance with the aforementioned equation (9). Then, the subroutine proceeds to step 17, where the ECU 2 calculates the regression coefficient vector θ in accordance with the aforementioned Equation (4).

Next, the subroutine proceeds to step 18, where the ECU 2 calculates the next value NEXP for the square matrix in accordance with the aforementioned equation (10), followed by termination of this subroutine for calculating the regression coefficient vector θ.

On the other hand, if the result of the determination at step 11 is NO, indicating that the condition is not established for calculating the regression coefficient vector θ, the subroutine proceeds to step 19, where the ECU 2 sets the preceding value PRVθ of regression coefficient vector as its current value θ, followed by termination of the subroutine for calculating the regression coefficient vector.

According to the exhaust gas purifying apparatus 1 of the first embodiment as described above, the ammonia produced by the ammonia production unit 10 is supplied to the NOx selective reduction catalyst 8 through the injector 14, so that NOx in exhaust gases is reduced for purification in cooperation of the ammonia with NOx selective reduction catalyst 8. In this event, the ammonia injection amount Tinh, supplied to the NOx selective reduction catalyst 8, is calculated such that the estimate Vnox_hat(k) of the detected value Vnox of the NOx sensor 20 reaches the minimum value Vnox_hmin, and such that the estimate Vnox_hat(k) converges to the detected value Vnox, so that the ammonia injection amount Tinh can be appropriately calculated in such a manner that both the ammonia concentration and NOx concentration in exhaust gases at a location downstream of the NOx selective reduction catalyst 8 present low values in a well balanced state for the reason set forth above. As a result, high NOx purification performance can be ensured to securely provide good exhaust gas characteristics. In addition, since the ammonia production unit 10 produces the ammonia using a fuel (gasoline) and air as raw materials, the ammonia can be produced as a reducing agent only by supplementing the fuel, while omitting the supplement of the reducing agent, and an infrastructure for supplementing the reducing agent can be eliminated. This results in improved convenience and product value.

Figure 10:
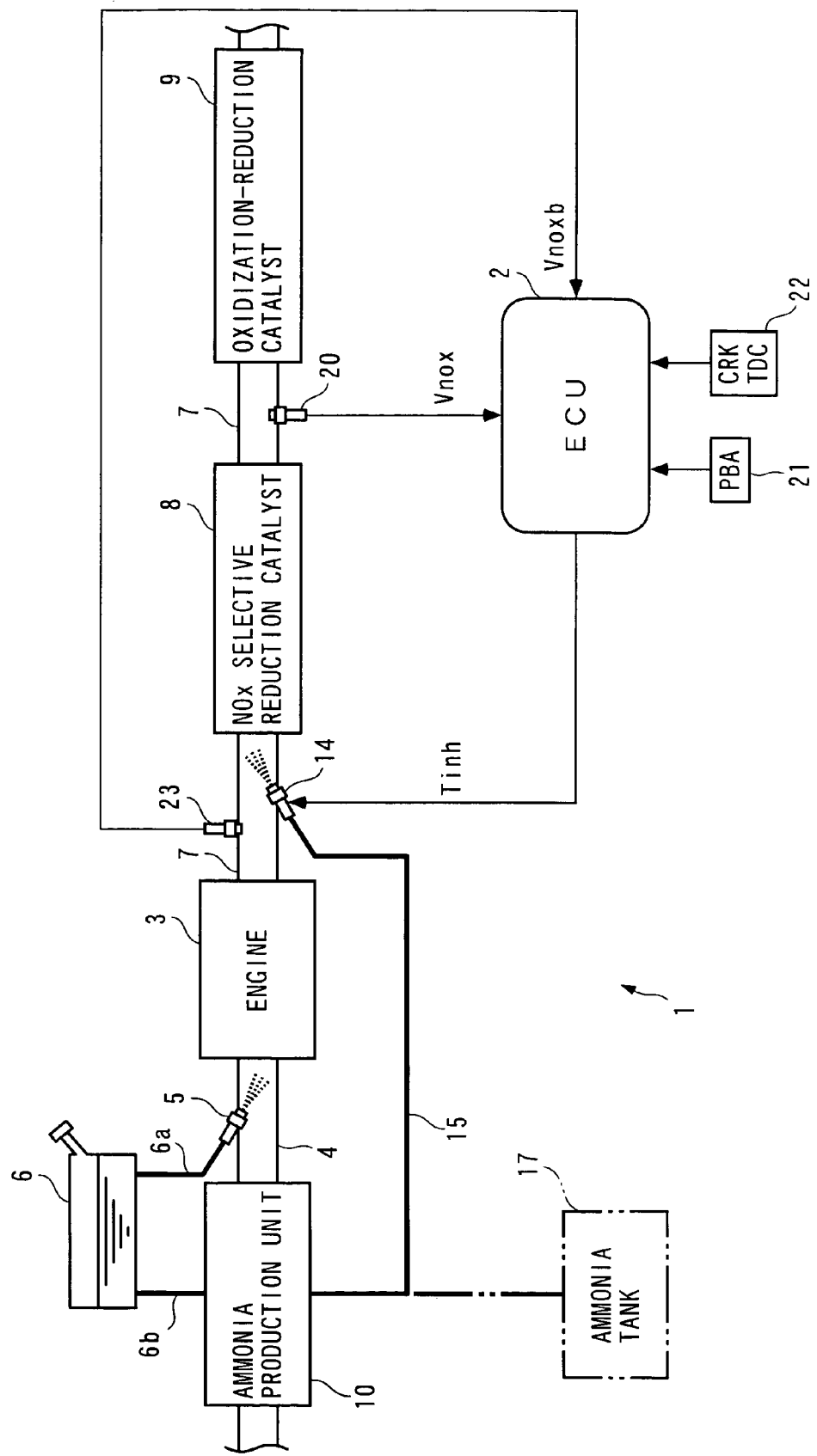
FIG. 10 is a block diagram generally illustrating the configuration of an exhaust gas purifying apparatus according to a second embodiment of the present invention, and an internal combustion engine which applies the exhaust gas purifying apparatus.

Next, an exhaust gas purifying apparatus 1A according to a second embodiment of the present invention will be described with reference to FIG. 10. The exhaust gas purifying apparatus 1A according to the second embodiment differs from the exhaust gas purifying apparatus 1 according to the first embodiment only in that a second NOx sensor 23 is provided in the exhaust pipe 7 in addition to the NOx sensor 20, as can be seen in FIG. 10, but is similar in the rest of configuration. Thus, the following description will be centered on different aspects therebetween, and components identical to those in the first embodiment are designated the same reference numerals, and description thereon will be omitted as appropriate.

The second NOx sensor 23, which is also of a limiting current type similar to the NOx sensor 20, detects a NOx concentration in exhaust gases to output a detection signal indicative of the NOx concentration to the ECU 2. Also, the second NOx sensor 23 is positioned in the exhaust pipe 7 at a location upstream of the injector 14 in order to exclusively detect the concentration of NOx discharged from the engine 3 without being affected by ammonia injected from the injector 14. The ECU 2 calculates the basic injection amount Tinh_base in accordance with a detected value Vnoxb indicated by a detection signal of the second NOx sensor 23, as described below.

Figure 11:
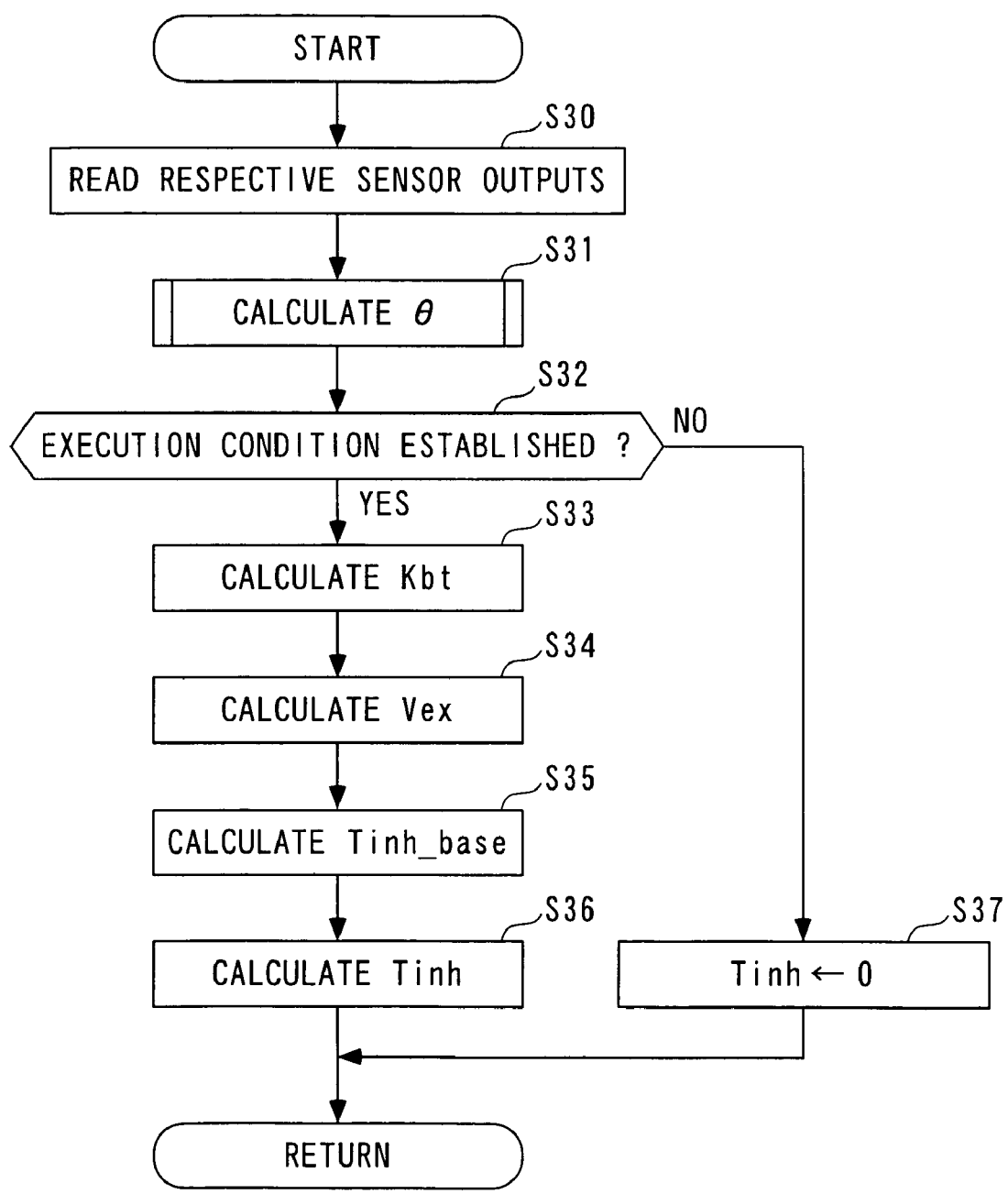
FIG. 11 is a flow chart illustrating a routine for controlling ammonia injection in the exhaust gas purifying apparatus in the second embodiment.

Also, in the exhaust gas purifying apparatus 1A, the ammonia injection amount Tinh is calculated in accordance with a routine for controlling the ammonia injection, illustrated in FIG. 11. This routine is similar to the routine illustrated in FIG. 7 except for steps 35, 36, so that the following description will be centered on steps 35, 36.

Figure 12:
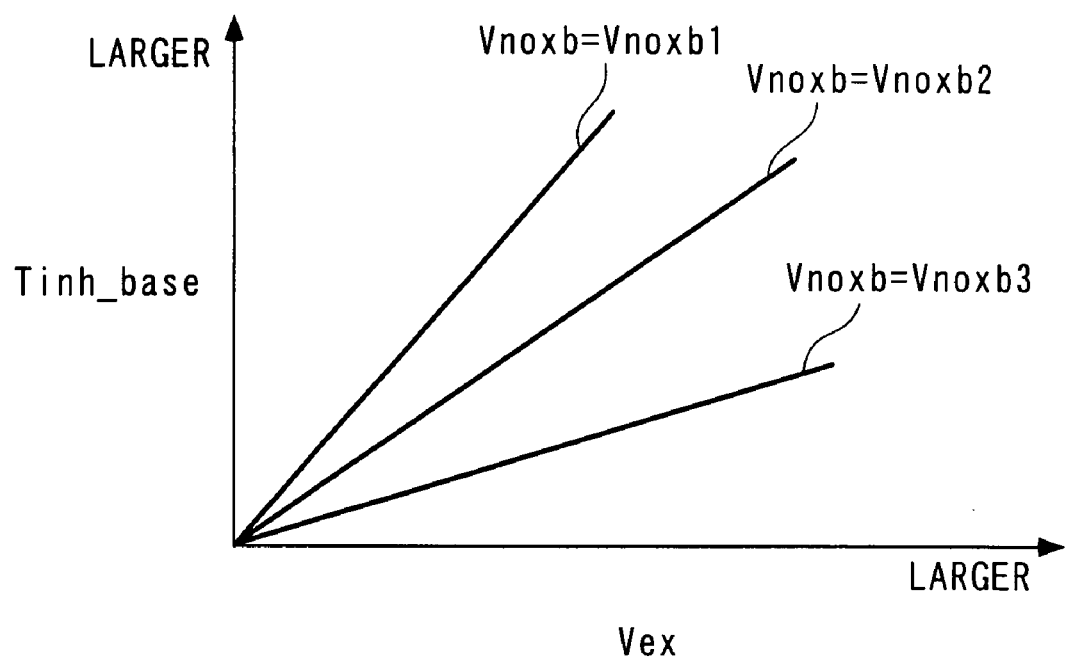
FIG. 12 is a diagram showing an exemplary map for use in a calculation of a basic injection amount Tinh_base at step 35 in the flow chart of FIG. 11.

In the routine illustrated in FIG. 11, after the ECU 2 calculates the exhaust gas volume Vex at step 34 as mentioned above, the routine proceeds to step 35, where the ECU 2 searches a map shown in FIG. 12 in accordance with the exhaust gas volume Vex calculated at step 34 and the detected value Vnoxb of the second NOx sensor 23 to retrieve the basic injection amount Tinh_base. In this map, three predetermined values Vnoxb1–Vnoxb3 of the detected value Vnoxb are set in a relationship represented by Vnoxb3<Vnoxb2<Vnoxb1. In other words, the map shows that the basic injection amount Tinh_base is set at a larger value in order to enhance the NOx reduction performance as the detected value Vnoxb of the second NOx sensor 23 is larger, stated another way, as the NOx concentration in exhaust gases discharged from the engine 3 is higher. Also, the basic injection amount Tinh_base is set at a larger value as the exhaust gas volume Vex is larger.

Next, the routine proceeds to step 36, where the ECU 2 calculates the ammonia injection amount Tinh in accordance with the aforementioned equation (2), followed by termination of the routine for controlling the ammonia injection.

According to the exhaust gas purifying apparatus 1A of the second embodiment as described above, the correction coefficient Kbt is calculated in accordance with a similar approach to the exhaust gas purifying apparatus 1 of the first embodiment, and the basic injection amount Tinh_base is calculated in accordance with the detected value Vnoxb of the second NOx sensor 23 and the exhaust gas volume Vex, so that the ammonia injection amount Tinh can be more accurately controlled in accordance with the NOx concentration in exhaust gases discharged from the engine 3, and the NOx concentration and ammonia concentration in exhaust gases purified by the NOx selective reduction catalyst 8. As a result, the exhaust gas purifying apparatus 1A of the second embodiment can more effectively reduce NOx in exhaust gases. Also, similar to the exhaust gas purifying apparatus 1 of the first embodiment, the ammonia can be produced as a reducing agent only by supplementing a fuel, thereby making it possible to omit the supplement of the reducing agent and to eliminate the infrastructure for supplementing the reducing agent.

While the respective embodiments described above have shown examples in which ammonia is used as a reducing agent, the reducing agent is not limited to ammonia, but may be produced using at least the fuel for the internal combustion engine as a raw material. For example, in an internal combustion engine which is fueled with gasoline, light oil, methanol, or the like, hydrocarbons, aldehyde, or the like produced from the fuel may be used as a reducing agent.

It should be further understood that the approach for ensuring ammonia to be supplied to the NOx selective reduction catalyst 8 is not limited to the examples in the respective embodiments which employ the ammonia production unit 10. For example, instead of the ammonia production unit 10, an ammonia tank 17 for storing ammonia may be provided in the engine 3, as indicated by two-dot chain lines in FIGS. 1 and 10, such that the ammonia is supplied to the NOx selective reduction catalyst 8 from the ammonia tank 17. In this event, when the ammonia stored in the ammonia tank 17 is reduced, extra ammonia may be supplemented from the outside. Alternatively, the engine 3 may be provided with both the ammonia production unit 10 and ammonia tank 17, such that the ammonia produced by the ammonia production unit 10 is stored in the ammonia tank 17, and the ammonia is supplied to the NOx selective reduction catalyst 8 as required from the ammonia tank 17.

It should be also understood that the exhaust gas purifying apparatus 1, 1A of the present invention can be applied not only to an internal combustion engine for a vehicle, as in the foregoing embodiments, but also to other internal combustion engines, for example, those for shipping and power generation. Furthermore, the exhaust gas purifying apparatus 1, 1A of the present invention can be applied to a diesel engine, not limited to the gasoline engine as in the foregoing embodiments, as a matter of course.

The NOx detector is not limited to the limiting current type NOx sensors 20, 23 used in the foregoing embodiments, but may be any NOx sensor such as a semiconductor NOx sensor, a surface potential type NOx sensor, or the like, as long as it is capable of detecting the NOx concentration in exhaust gases. Further, the Nox sensor 20 employed in the foregoing embodiment outputs a higher detected value Vnox as the NOx concentration or ammonia concentration is higher. Alternatively, the exhaust gas purifying apparatus of the present invention may employ a NOx sensor which outputs a smaller detected value Vnox as the NOx concentration or ammonia concentration is higher. In this alternative, the correction coefficient Kbt may be calculated such that the estimate Vnox_hat(k) reaches a maximum value.

As will be appreciated from the foregoing, the exhaust gas purifying apparatus according to the present invention can appropriately determine the amount of the reducing agent supplied to the NOx selective reduction catalyst to ensure good exhaust gas characteristics.

What is claimed is:

1. An exhaust gas purifying apparatus for an internal combustion engine comprising:
   a NOx selective reduction catalyst disposed in an exhaust passage of said internal combustion engine for purifying NOx in exhaust gases flowing through said exhaust passage under the existence of a reducing agent;
   a NOx detector disposed in said exhaust passage at a location downstream of said NOx selective reduction catalyst for detecting a NOx concentration in exhaust gases;
   a reducing agent supply unit for supplying the reducing agent to said NOx selective reduction catalyst;
   exhaust gas volume detecting means for detecting an exhaust gas volume of said internal combustion engine;
   basic supply amount determining means for determining a basic supply amount of the reducing agent to said NOx selective reduction catalyst in accordance with the detected exhaust gas volume;
   estimated value calculating means for calculating an estimated value of a detected value detected by said NOx detector on the basis of a model indicative of a relationship between the estimated value and a correction coefficient for correcting the basic supply amount of the reducing agent; and supply amount determining means for determining an amount of the reducing agent supplied to said NOx selective reduction catalyst by said reducing agent supply unit by determining the correction coefficient on the basis of said model such that the estimated value reaches an extreme value.

2. An exhaust gas purifying apparatus for an internal combustion engine according to claim 1, further comprising
an upstream NOx detector disposed in said exhaust passage at a location upstream of said NOx selective reduction catalyst for detecting the NOx concentration in exhaust gases,
wherein said
basic supply amount determining means determines the basic supply amount in accordance with the NOx concentration detected by said upstream NOx detector and the detected exhaust gas volume.

3. An exhaust gas purifying apparatus for an internal combustion engine according to claim 1, further comprising a reducing agent production unit for producing the reducing agent using at least a fuel for said internal combustion engine as a raw material.

4. An exhaust gas purifying apparatus for an internal combustion engine according to claim 3, wherein said reducing agent is ammonia.

5. An exhaust gas purifying method for an internal combustion engine comprising the steps of:
purifying NOx in exhaust gases flowing through an exhaust passage using a NOx selective catalyst under the existence of a reducing agent;
detecting a NOx concentration in exhaust gases;
supplying the reducing agent to a NOx selective reduction catalyst;
detecting an exhaust gas volume of said internal combustion engine;
determining a basic supply amount of the reducing agent to said NOx selective reduction catalyst in accordance with the detected exhaust gas volume;
calculating an estimated value of a detected value detected by said NOx detector on the basis of a model indicative of a relationship between the estimated value and a correction coefficient for correcting the basic supply amount of the reducing agent; and
determining the amount of the reducing agent supplied to said NOx selective reduction catalyst by determining the correction coefficient on the basis of said model such that the estimated value reaches an extreme value.

6. An exhaust gas purifying method for an internal combustion engine according to claim 5, further comprising the step of
detecting the NOx concentration in exhaust gases in said exhaust passage at a location upstream of said NOx selective reduction catalyst,
wherein said step of determining the basic supply amount is performed in accordance with the NOx concentration detected at the location upstream of said NOx selective reduction catalyst and the detected exhaust gas volume.

7. An exhaust gas purifying method for an internal combustion engine according to claim 5, further comprising the step of producing the reducing agent using at least a fuel for said internal combustion engine as a raw material.

8. An exhaust gas purifying method for an internal combustion engine according to claim 7, wherein said reducing agent is ammonia.

9. An engine control unit including a control program for causing a computer to execute an exhaust gas purifying method for an internal combustion engine,
wherein said control program causes the computer to instruct an exhaust gas purifying apparatus to purify NOx in exhaust gases flowing through an exhaust passage under the existence of a reducing agent; instruct a NOx sensor to detect a NOx concentration in exhaust gases; instruct a reducing agent supply unit to supply the reducing agent to a NOx selective reduction catalyst; instruct exhaust gas volume detecting means to detect an exhaust gas volume of said internal combustion engine; determine a basic supply amount of the reducing agent to said NOx selective reduction catalyst in accordance with the detected exhaust gas volume; instruct estimated value calculating means to calculate an estimated value of a detected value detected by said NOx sensor on the basis of a model indicative of a relationship between the estimated value and a correction coefficient for correcting the basic supply amount of the reducing agent; and determine the amount of the reducing agent supplied to said NOx selective reduction catalyst by determining the correction coefficient on the basis of said model such that the estimated value reaches an extreme value.

10. An engine control unit according to claim 9, wherein said control program further causes the computer to instruct an upstream NOx sensor to detect the NOx concentration in exhaust gases a location upstream of said NOx selective reduction catalyst and determine the a basic supply amount in accordance with the NOx concentration detected at the location upstream of said NOx selective reduction catalyst and the detected exhaust gas volume.

11. An engine control unit according to claim 9, wherein said control program further causes the computer to instruct a reducing agent production unit to produce the reducing agent using at least a fuel for said internal combustion engine as a raw material.

12. An engine control unit according to claim 11, wherein said reducing agent is ammonia.

13. An engine control unit according to claim 9, wherein said model indicates a relationship between the estimated value and the correction coefficient determined before a dead time, which is a time taken by exhaust gasses discharged from said internal combustion engine to reach said NOx detector.

14. An engine control unit according to claim 9, wherein said control program further causes the computer to instruct an identifying means in said estimated value calculating means to identify a mode parameter of said model by a least square method such that the estimated value converges to the detected value of said NOx detector.

15. An exhaust gas purifying apparatus for an internal combustion engine according to claim 1, wherein said model is one indicative of a relationship between the estimated value and the correction coefficient determined before a dead time, which is a time taken by exhaust gasses discharged from said internal combustion engine to reach said NOx detector.

16. An exhaust gas purifying apparatus for an internal combustion engine according to claim 1, wherein said estimated value calculating means includes identifying means for identifying a mode parameter of said model by a least square method such that the estimated value converges to the detected value of said NOx detector.

17. An exhaust gas purifying method for an internal combustion engine according to claim 5, further comprising said model indicating a relationship between the estimated value and the correction coefficient determined before a dead time, which is a time taken by exhaust gasses discharged from said internal combustion engine to reach said NOx detector.

18. An exhaust gas purifying method for an internal combustion engine according to claim 5, wherein said step of calculating an estimated value includes identifying a mode parameter of said model by a least square method such that the estimated value converges to the detected value of said NOx detector.

* * * * *